United States Patent [19]
Young

[11] 3,833,415
[45] Sept. 3, 1974

[54] METHOD AND APPARATUS FOR TEMPERATURE CONTROL OF A ROTATING METAL OXIDE SCRAPER ELEMENT

[75] Inventor: Elgin E. Young, Norton, Ohio

[73] Assignee: PPG Industries, Inc., Pittsburgh, Pa.

[22] Filed: Aug. 30, 1972

[21] Appl. No.: 284,787

Related U.S. Application Data

[60] Division of Ser. No. 147,386, May 27, 1971, which is a continuation-in-part of Ser. No. 856,744, Sept. 10, 1969, abandoned.

[52] U.S. Cl................ 134/6, 23/252 R, 23/284, 134/22 R
[51] Int. Cl................ B08b 9/08, B01j 1/00
[58] Field of Search......... 165/1, 39, 40, 94; 134/6, 134/22 R; 15/104.16; 23/252 R, 284

[56] References Cited
UNITED STATES PATENTS

| | | | |
|---|---|---|---|
| 2,684,287 | 7/1954 | Seavey | 23/252 R |
| 2,805,921 | 9/1957 | Schaumann | 15/104.16 X |
| 3,391,998 | 7/1968 | Groves et al. | 23/252 R |
| 3,423,186 | 1/1969 | Darr et al. | 134/6 X |
| 3,522,016 | 7/1970 | Groves et al. | 23/284 X |

*Primary Examiner*—S. Leon Bashore
*Assistant Examiner*—Richard V. Fisher
*Attorney, Agent, or Firm*—Irwin M. Stein

[57] ABSTRACT

Wall temperatures within a movable, internally cooled scraper element that is used to dislodge metal oxide accumulation from the internal wall of a reactor are monitored by a thermocouple electrically connected to mercury baths which are in turn electrically connected to a temperature recorder. The thermocouple output can be used to control a regulator of coolant fed to the scraper element.

4 Claims, 3 Drawing Figures

3,833,415

METHOD AND APPARATUS FOR TEMPERATURE CONTROL OF A ROTATING METAL OXIDE SCRAPER ELEMENT

CROSS-REFERENCE TO RELATED APPLICATIONS

This application is a divisional application of my earlier filed copending application U.S. Ser. No. 147,386 filed May 27, 1971, which application is a continuation-in-part application of my earlier filed copending application, U.S. Ser. No. 856,744, filed Sept. 10, 1969 now abandoned.

BACKGROUND OF THE INVENTION

In the typical vapor phase oxidation process for the production of pigmentary metal oxides, oxygen-containing gas and the corresponding metal halide are introduced into a closed reaction chamber and reacted therein at elevated temperatures. In the production of pigmentary titanium dioxide, at least one titanium tetrahalide selected from the group consisting of titanium tetrachloride, titanium tetrabromide and titanium tetraiodide, and oxygen or oxygen-containing gas are introduced into a suitable reaction vessel and reacted therein at temperatures above 600° C., usually in the range of from 900° C. to 1,500° C. Descriptions of the vapor phase oxidation process for the production of pigmentary titanium dioxide are disclosed in U.S. Letters Pat. Nos. 2,791,490 to Wilcox; 2,670,275 to Olson et al; 2,823,982 to Saladin et al; 2,968,529 to Wilson; 3,068,113 to Strain et al; 3,069,281 to Wilson; 3,069,282 to Allen; and 3,214,284 to Wilson.

A frequent problem encountered in the production of pigmentary metal oxides, e.g., titanium dioxide, is the formation of metal oxide growth or encrustation upon the walls of the reaction chamber. This encrustation tends to accumulate and grow; and if it is not timely removed, it develops into a doughnut or ring which eventually closes and plugs the reactor, thereby hindering the continuous and economical operation of the process and making it impractical as a commercial operation.

In the prior art, several methods have been proposed for removing such metal oxide accumulation. Thus, it has been proposed to flow a gas transversely through the reactor departing See, for example, U.S. Letters Pat. No. 2,957,753. Another method proposed is to dislodge the scale by means of scraper elements. See, for example, U.S. Pat. No. 2,805,921 to Schaumann and U.S. Pat. No. 3,423,186 to Darr et al.

Portions of the aforementioned scraper elements are typically metallic and internally cooled because of the aforesaid elevated temperatures and corrosive and oxidative atmosphere existing in the reactor. For the above reasons, it is desirable to monitor and control the skin or wall temperatures of the metallic portions of the scraper element so that adjustments can be made in the rate or temperature of the coolant used to cool the scraper element and thereby avoid its corrosion and ultimate failure. Typically, the scraper element moves or rotates within the reactor, thereby providing a need to monitor and transfer temperature readings from a moving, e.g., rotating, environment to a stationary environment outside of the reactor. Although the reactor is closed, the environment outside the reactor is sufficiently corrosive to some metals, such as brass, to prevent the use of some conventional electrical measurement apparatus. There exists, therefore, a need to provide a system which is both resistant to the atmosphere outside the reactor and which is capable of measuring and transmitting temperatures from a moving environment to a stationary environment.

BRIEF SUMMARY OF THE INVENTION

In the present invention, there is provided both method and apparatus for measuring and controlling the wall temperatures within a moving, internally cooled scraper element that dislodges metal oxide accumulation from the internal wall of a reactor. More particularly, there is provided an internally cooled scraper element having fluid inlet and outlet means through which coolant is passed, thermoelectric means having a hot junction and a pair of terminal ends, the hot junction being attached to and in good thermal contact with the scraper element at the spot at which temperature is to be measured, separate electrically insulated mercury baths or pools, each of which is in electrical contact with one of the aforesaid pair of terminal ends, temperature measurement means such as a temperature recorder electrically connected to the mercury baths and fluid rate control means, such as a diaphragm valve, that is interposed between the scraper element fluid inlet means and a coolant source and that controls the rate of flow of coolant into the fluid inlet means. In a further embodiment, the fluid rate control means is automatically controlled by a controller which is connected, electrically or pneumatically, to the temperature measurement means and the fluid rate control means.

BRIEF DESCRIPTION OF THE DRAWINGS

The present apparatus and method will be more fully understood by reference to the accompanying drawings wherein:

FIG. 3 is a top view of the apparatus of FIG. 1 taken at section line III—III.

DETAILED DESCRIPTION

Figure 1:
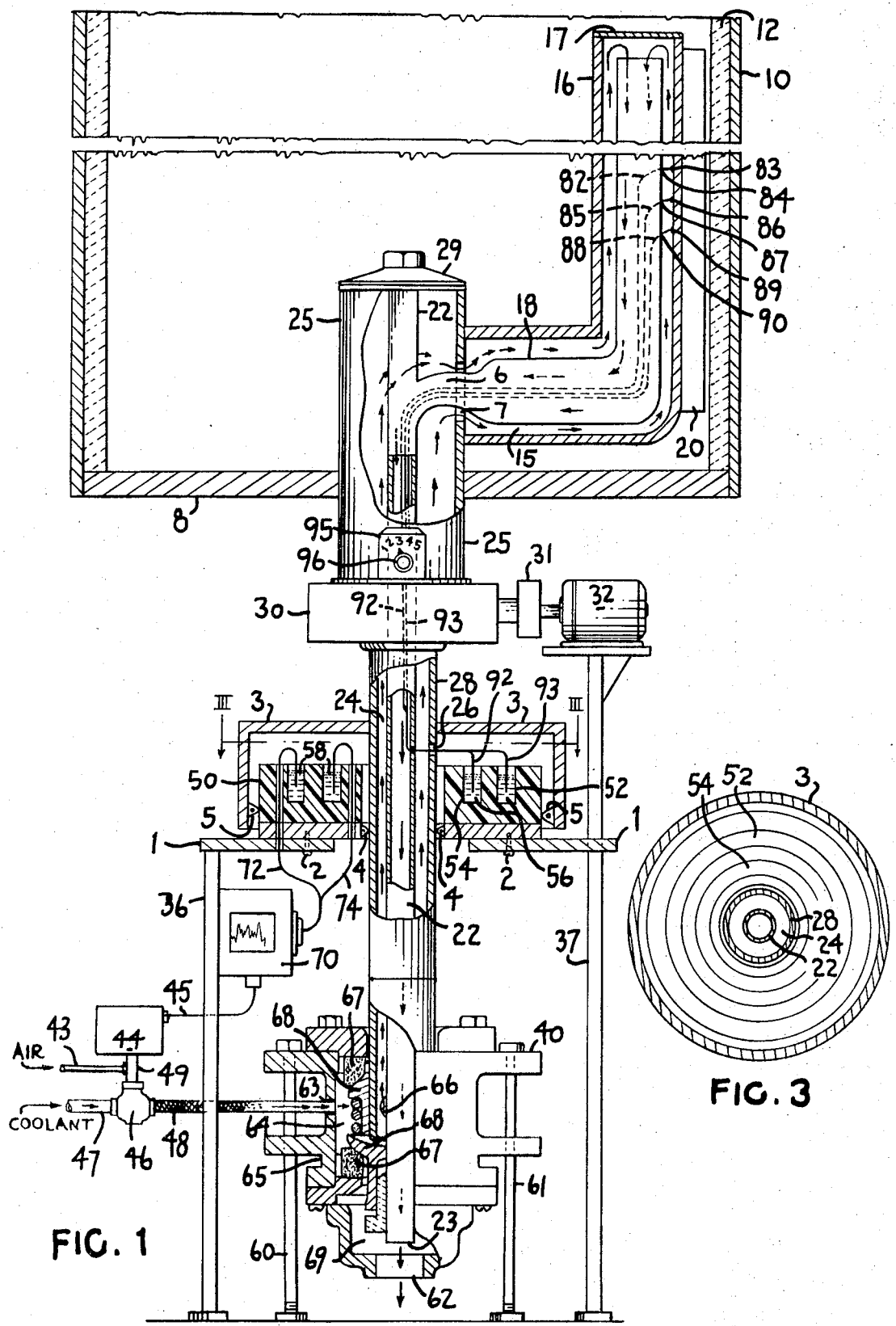
FIG. 1 is a vertical, diagrammatic, partially sectional view of the lower portion of a cylindrical reactor illustrating a scraper element and temperature measurement means for monitoring the temperature of the wall of the scraper elements and means for effecting control of said measured temperature.

The preparation of pigmentary metal oxides by vapor phase oxidation of the corresponding metal halide is an art recognized reaction. The halide and oxidizing gas are introduced and mixed swiftly in a hot reaction zone maintained at the temperature at which the vapor phase oxidation occurs. In the preparation of pigmentary titanium dioxide by vapor phase oxidation of titanium halide, the temperature of the reaction zone generally ranges between about 900° C. and 1,500° C. Typically, the titanium tetrahalide is selected from the group consisting of titanium tetrachloride, titanium tetrabromide and titanium tetraiodide. Titanium tetrafluoride is generally considered not to be useful for this oxidation reaction and is, therefore, not included in the term titanium tetrahalide. The reaction produces pigmentary titanium dioxide suspended in by-product gases, such as chlorine or other halogen, and gases such as nitrogen, carbon monoxide, carbon dioxide, etc., depending on the manner in which the vapor phase oxidation is conducted. This gaseous suspension of titanium dioxide particles is removed from the reactor, cooled and the solid titanium dioxide component thereof collected by conventional collection equipment, such as dust collectors, used to separate a finely-divided solid from suspending gases. The titanium dioxide product when further processed in a manner known in the art produces a valuable pigment for paints and other coating compositions, as well as in other fields where such pigment is used.

The above-described, apparently simple, vapor phase oxidation reaction is nevertheless fraught with considerable operating difficulties. A specific major problem associated with the aforementioned oxidation reaction is the objectionable tendency of the titanium dioxide produced within the reactor to deposit upon the reactor wall and other hot surfaces of the apparatus. Such deposits or scale tend to adhere tightly to such surfaces and build up thereon until a relatively thick coating of titanium dioxide forms. Eventually, a buildup can cause obstruction of the reactor or reactant inlet nozzles and, in this event, results in an unscheduled shutdown of the process.

It has been proposed to remove such objectionable deposits from the wall of the reactor by means of one or more scraper elements which are intermittently or continuously rotated within the reaction chamber so as to dislodge the titanium dioxide accumulations thereon. See, for example, U.S. Pat. No. 3,423,186 to Darr et al which is incorporated herein, in toto, by reference. Briefly, this patent describes a method and apparatus for removing metal oxide accumulations, such as titanium dioxide, from the internal wall of a cylindrical reactor vessel. Such removal is accomplished by rotating within the reactor and close to the wall thereof an internally cooled scraper supporting arm to which is attached a knife-like solid ceramic edge which has a high resistance to the corrosive environment within the reactor, a thermal conductivity of less than 210 B.T.U./(hour), (hour), (square foot), (°F./inch) and a Mohs hardness of at least 5. The ceramic edge is usually spaced from ¼ – 2 inches from the reactor wall. Examples of suitable materials for the ceramic edge is aluminum silicate or the steatite product of talc.

Because of the relatively high temperatures and corrosive environment in which the scraper element is operated, it is customary to internally cool its metallic surfaces. Such cooling inhibits corrosion and mechanical failure of the scraper element. Further, because of the need to maintain the operation of the scraper element, it is desirable to monitor the temperatures of the metal surfaces of the scraper element so as to adjust, if necessary, the rate of cooling of such surfaces, i.e., increase or decrease the amount of heat removed from the metal surfaces. However, because of the mobile, e.g., rotational, character of the scraper element, means are required for transferring temperatures from a moving environment within the reactor (the scraper element) to a stationary environment outside the reactor (a temperature measurement device).

The aforementioned temperature transmission is further complicated by the lightly corrosive nature of the environment outside the reactor. While the corrosivity of the environment outside of the reactor is slight compared to that existing within the reactor, nevertheless, it is significant in relation to the type of metals employed in some conventional temperature measurement devices and associated electrical apparatus. It is, therefore, necessary to have a system which is both resistant to the environment and has the capability of transmitting temperature measurements from a moving environment to a stationary environment. Such a system is provided by the method and apparatus described herein which may be more fully understood by reference to the accompanying drawings.

Referring now to the drawings, wherein like numbers designate like parts throughout and particularly to FIG. 1, there is shown a vertical diagrammatic, partially sectional view of the lower portion of cylindrical reactor 10 having a bottom 8. The reactor shell and bottom can be fabricated from conventional metals, such as steel or nickel. Optionally, the reactor shell can be insulated against the heat and corrosivity of the environment within the reactor by one or more layers of insulating and refractory brick 12. Located adjacent to but spaced from the shell of reactor 10 or ceramic brick lining 12, if used, is scraper edge 20, which is attached to hollow metallic support arm 16 having a cap 17. Although only one support arm and scraper edge is illustrated in FIG. 1, two or more of such supporting arm elements and scraper edges can be used. See, for example, FIG. 1 of U.S. Pat. No. 3,423,186 wherein three such elements are shown. As used herein, the term "scraper element" is intended to mean and include both the support arm and solid scraper edge. Scraper edge 20 can be fabricated from either suitable metals, e.g., nickel, which when cooled to below 600° C. is resistant to the temperature and corrosive environment (chlorine) within the reactor; or, it can be a ceramic material, such as described hereinabove and in U.S. Pat. No. 3,423,186. Typically, the hollow metallic support arm 16 and scraper edge 20, if metallic, are internally cooled by flowing conventional fluids employed as heat exchange media, i.e., gases or liquids, e.g., water and air, in good heat exchange contact with the walls to be cooled.

Within hollow L-shaped support arm 16 is hollow L-shaped tube 18 which extends almost to but is spaced from cap 17 and which is connected at its lower terminus to hollow tube 22. Tube 18 is also spaced from the inner wall of support arm 16 to form annular space 15 to allow the passage of coolant therein. Hollow tube 22 is located within casing 25 and hollow shaft 28. At its upper end, hollow tube 22 is immovably connected to casing cover 29; while at its lower extension, it forms a part of rotary joint 40 wherein it terminates.

At the spot where support arm 16 is connected to casing wall 25, a hole 7 having a diameter larger than the diameter of hollow tube 18 (which at that point is necked down as shown) is provided to permit the passage of coolant between the wall of casing 25 and the outer wall of tube 18 into annular space 15.

Circular movement is provided to hollow shaft 28, casing 25, hollow tube 22, scraper edge 20 and supporting arm 16 by motor means 32 which is connected to gear reducer means 30 by power transfer and gear drive means 31. Gear reducer means 30 is fixably connected to casing 25.

Within hollow tube 18 are shown three thermoelectric means, e.g., thermocouples, 82, 85 and 88. Although three thermoelectric means are shown, more or less, e.g., one can be used. The hot junctions of thermocouples 82, 85 and 88 are embedded and attached within the wall of support arm 16 at spots 83, 86 and 89 respectively to provide good thermal contact with that wall. The hot junctions can be attached to the internal wall of support arm 16 by any suitable means, such as welding or mechanical attachment. Typically, the hot junctions are placed within the wall of support arm 16 and near the metal surface exposed to the interior of the reactor. This arrangement avoids cooling of the hot junction by the cooling fluid and direct exposure of the hot junction to the temperatures and corrosive environment within the reactor. Although the spots of attachment are shown near the ceramic edge, the spots can be at any convenient point in the wall. Thermoelectric means 82, 85 and 88 traverse tube 18 through holes 84, 87 and 90 respectively provided therefor.

Thermocouple means 82, 85 and 88 extend from their spot of attachment down through the L-shaped portion of tube 18 and into hollow tube 22 from whence they are drawn through holes (not shown) in tube 22 and casing 25 to selector switch 95. The aforesaid holes are, of course, provided with appropriate seals to prevent leakage in or out. Selector switch 95 is shown as having six positions which may be selected by turning dial 96. Each pair of terminal ends of thermoelectric means 82, 85 and 88 are connected to terminals (not shown) in selector switch 95. Although only six positions are shown on selector switch 95, more or less can be used. The exact number of positions required will depend on the number of scraper elements used and the number of positions within each scraper element for which temperature measurement is desired. Of course, more than one selector switch can be used. Lead wires 92 and 93 from selector switch 95 are drawn inside casing 25 and hollow shaft 28 and through a hole 26 in casing 25 and are then immersed in the mercury pools 56 in troughs 52 and 54 in dish 50 thereby connecting electrically selector switch 95 to the mercury 56 in said troughs. Above mercury 56 in troughs 52 and 54 is a liquid seal of a non-conductive liquid 58, e.g., an insulating hydrocarbon oil, such as transformer oil. Conductors 72 and 74 connect temperature measurement means 70, e.g., temperature recorder, electrically to the mercury 56 in troughs 52 and 54, thereby completing the electrical circuit to the temperature recorder 70.

Dish 50, which can be made of any non-conductive material, e.g., a laminated plastic block, such as a Micarta block, is supported by right angle support arms 1 and is fastened thereto by fasteners 2. Hollow shaft 28 rotates within stationary dish 50 by means of rubber clipper seals 4. Dish 50 is further restrained from movement by rubber clipper seals 5 attached to right angle support arms 3 which are connected to shaft 28. As shown, conductors 72 and 74 traverse the width of dish 50 and enter troughs 52 and 54 from the top. However, any other suitable means of electrically connecting lead wires 72 and 74 to the mercury in troughs 52 and 54 can be used, such as shown in FIG. 2.

Figure 2:
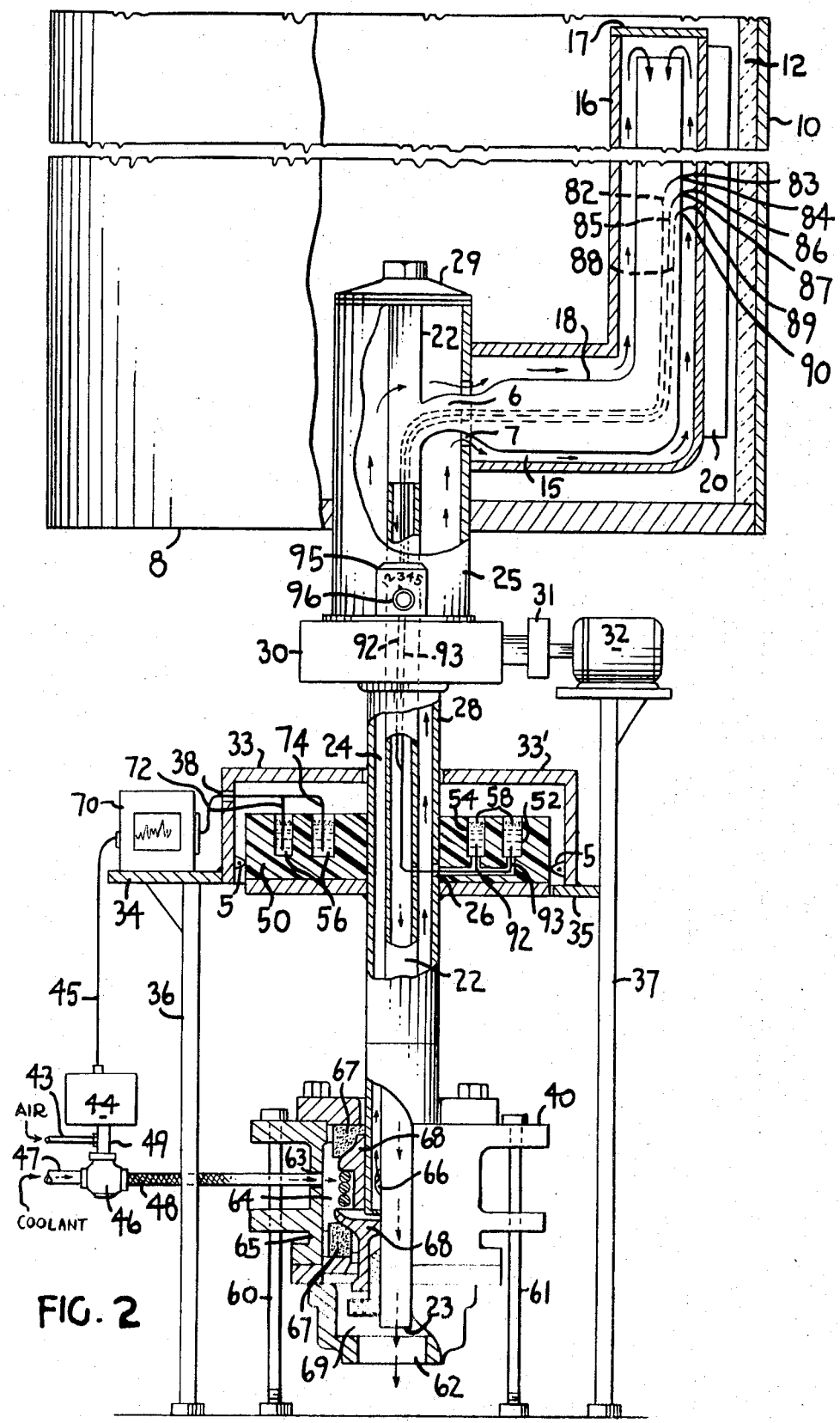
FIG. 2 is a vertical, diagrammatic, partially sectional view of apparatus similar to that illustrated in FIG. 1 showing a further embodiment of the temperature measurement means of FIG. 1.

In FIG. 2, dish 50 is fixedly attached to shaft 28 and turns in the same direction as that shaft and scraper support arm 16. Dish 50 is pressed against shaft 28 for further support and movement control by means of right angle support arms 33 and 33' and clipper seals 5. Support arm 33 is connected to platform 34 which is supported by leg 36. Similarly, support arm 33' is connected to leg 37 by rod 35. Conductors 72 and 74 pass through a hole 38 in support arm 33 and enter the mercury 56 in troughs 52 and 54 from above. In this case, leads 92 and 93 enter troughs 52 and 54 from below, while conductors 72 and 74 enter from the top without traversing the width of dish 50. Leads 92 and 93 are so positioned so as not to contact conductors 72 and 74 as the leads pass the stationary conductors 72 and 74.

In FIGS. 1 and 2, the terminal ends of thermoelectric means 82, 85 and 88 are connected electrically to the mercury pools 56 through selector switch 95. However, when only one thermocouple means is used, the terminal ends of that thermocouple can be drawn directly to and immersed in the mercury pools, i.e., one of the pair of terminal ends would be immersed in the mercury in trough 52 while the other was immersed in the mercury in trough 54.

Although only two troughs have been shown in FIGS. 1, 2 and 3, it is obviously possible to utilize multiples thereof. For each thermocouple wire employed, two mercury troughs electrically insulated from each other are required. However, when multiple thermocouples are employed, it is more convenient to utilize the rotary switch device illustrated in FIGS. 1 and 2.

The particular thermoelectric means used will depend on relative cost, temperature ranges to be measured and resistance to corrosion. Any suitable thermoelectric device, i.e., a device which produces electricity by the action of heat on two dissimilar joined metals, e.g., thermocouples, can be used. The following table shows some common thermocouples, their composition and common operating temperature range.

| Thermocouple Symbol | Positive | Negative | Temperature Range, °F. |
|---|---|---|---|
| Q. R. | Platinum | Platinum-rhodium (90% Pt, 10% Rh) | 1300 to 2900 |
| M. A. | Chromel (90% Ni) | Alumel (95% Ni, 2% Al, 3% Mn, 1% Si) | 0 to 2100 |
| I. C. | Iron | Constantan (60% Cu, 40% Ni) | 0 to 1600 |
| C. C. | Copper | Constantan (60% Cu, 40% Ni) | −300 to +600 |

In general, iron-constantan thermocouples perform best in reducing atmospheres. Chromel-alumel thermocouples, conversely, perform best in oxidizing atmospheres. Copper-constantan thermocouples are generally used in low temperature work where atmospheric conditions are not critical, and they are preferable where moisture is high. Platinum-rhodium thermocouples, when suitably protected, can be used in either oxidizing or reducing atmospheres. The cost, however, of noble metal thermocouples typically is usually prohibitive for most industrial use.

The type of temperature measurement means utilized can also vary depending on whether it is desirable to indicate temperatures, record temperatures, or operate a controller. Generally, the temperature measurement device is a potentiometer or millivoltmeter which is calibrated in terms of temperature. As shown in FIGS. 1 and 2, the temperature measurement means 70 is connected to controller means 44 by connecting means 45 in order to translate temperatures recorded by the temperature measurement means into automatic regulation of the rate at which cooling fluid is introduced into the hollow support member and/or scraper edge. Connecting means 45 can be, for example, a pair of electrical conductors or a flexible piece of hollow tubing for carrying air, i.e., a pneumatic connection. Controller means 44 is responsive to temperature measured by the hot junction of the thermoelectric means and recorded by temperature measurement means 70.

Controller means 44 is connected to valve 46 which can be any suitable variable-type valve, i.e., a valve that can manually or automatically vary the rate of coolant passing from a source not shown through it, e.g., a diaphragm valve. Of course, if desired, controller means 44 can be eliminated entirely and valve 46 manually operated in response to the recorded temperature on recorder 70. Typically, controller 44 is designed to actuate a diaphragm valve 46 located in the coolant supply pipe 47 to regulate the amount of coolant admitted through flexible coolant supply pipe 48 to rotary joint 40 in response to temperatures affecting the hot junction of thermoelectric means 82, 85 and 88. The valve 46 is operated by compressed air carried through a line 49 connecting this valve to the controller 44. Compressed air is supplied to the controller 44 through a line 43 supplied from a source not shown. Control instruments similar to controller 44 are readily obtainable in the commercial market.

Flexible pipe 48 is connected to the casing 65 of rotary joint 40 at inlet port 63 which opens into annular space 64 formed by the internal wall of casing 65 and seats 68 adjacent to the lower extension of shaft 28. Suitable seals 67, e.g., carbon seals, adjacent the upper casing and seats 68 seal the annular space 64 from the environment external to the joint. At the lower extension of shaft 28, there are a series (two-three) of inlet ports (holes) 66 which connect the interior of shaft 28 to annular space 64. Shaft 28 terminates below inlet ports 66 but above the open terminus 23 of inner hollow tube 22. Casing 65 has a stationary outlet 62 through which coolant leaves the closed system. Rotary joint 40 is supported by legs 60 and 61.

In the operation of the apparatus described, for example in FIG. 1, scraper support member 16, internal hollow conduits 18, 22 and 28 and casing 25 are rotated by means of the power transmitted to them by motor 32. Scraper edge 20 dislodges metal oxide accumulation from the surface of ceramic lining 12 as it passes in dislodging contact with such accumulation. Dish 50 remains stationary while the terminal ends of leads 92 and 93 from selector switch 95 move through the mercury baths in troughs 52 and 54 at the same rotational speed as the scraper element. Temperature measurement means 70 and conductors 72 and 74 therefrom are also stationary. Conductors 72 and 74 are positioned in a manner such that they do not interfere or make contact with the rotating terminal ends of leads 92 and 93 from selector switch 95.

Coolant, e.g., air, from a source not shown, is introduced through conduit 47 and valve 46 and from thence through flexible conduit 48 into annular space 64 in rotary joint 40. The coolant air passes through the inlet holes 66 into the lower section of rotating shaft 28 and up the annular space 24 formed by concentric hollow tubes 22 and 28. The coolant is then forced through the fluid inlet opening 7 formed by the outer wall of internal L-shaped tube 18 and casing 25. From there, the coolant travels up toward the cap 17 of scraper support arm 16 within annular space 15 formed by the parallel L-shaped tubes 18 and support arm 16. As the coolant travels up the support arm, it picks up heat transmitted through the walls of support arm 16 and removes such heat from that environment. At the top of support arm 16, the coolant is turned downward by cap 17 into the interior of tube 18. The coolant, which at this point is hotter than at its point of entry into the system at the rotary joint, travels down through tube 18 and leaves the scraper element at fluid outlet means 6 which is that section of tube 18 which is joined to tube 22. The coolant then travels down the interior of tube 22 into the space 69 in rotary joint 42 formed by the terminus 23 of tube 22 and the bottom of the rotary joint. The coolant leaves the system through fluid outlet 62 at the bottom of rotary joint 40, which outlet is openly connected to annular space 69.

Because of the difference in temperature between the hot and cold ends of thermoelectric means 82, 85 and 88, an electric potential is generated in each which potential is transmitted to the mercury 56 in troughs 52 and 54 through selector switch 95. The particular potential so transmitted, of course, depends on the position of the selector switch. The electric potential is picked up by leads 72 and 74 and transmitted to temperature recorder 70 where the temperature is read or recorded.

Controller 44 can be adjusted to actuate valve 46 at any selected temperature seen by the hot junctions of the thermoelectric means and measured by recorder 70. When that temperature is reached, valve 46 is actuated to increase the flow rate of coolant through the system and thereby regulate the heat removed by it from the scraper element. If desired, heat exchanger means can be installed in conduit 47 to cool the coolant before it enters the system. Further, the heated coolant emerging from outlet 62 can be cooled and recycled to the coolant source to make the cooling system self-contained, except for make-up coolant.

The scraper element(s) described herein can be rotated continuously or intermittently as desired. The exact rate will depend on the amount and rate of metal oxide buildup on the reactor walls. When more than one scraper element is used, the rotational rate can be appropriately decreased by a factor equal to the total number of elements used.

Although the present invention has been described with particularity with respect to the production of pigmentary titanium dioxide, the apparatus and method described herein are equally applicable to the production of other metal oxides. Typical examples of other metal oxides which can be produced by oxidation of their corresponding metal halide include the metal oxides of iron, silicon, aluminum, zirconium, arsenic, beryllium, boron, phosphorus, strontium, tantalum, thorium, tin, titanium, zinc, antimony, lead and mercury.

The present process is more particularly described in the following examples which are intended as illustrative only since numerous modifications and variations therein will be apparent to those skilled in the art.

EXAMPLE I

A reactor for the vapor phase oxidation of titanium tetrachloride having a scraper element similar to that shown in FIG. 1 but without the temperature measurement system shown therein was used in the present example. Brass commutator rings were attached to the casing 25 and the terminal ends of an iron-constantan thermocouple were electrically connected to these rings. The hot junction of the thermocouple was attached within the wall of the scraper element which was air cooled. Carbon brushes electrically connected to a temperature recorder were spring mounted to provide tension against the brass commutator rings and to complete the electrical circuit. As the scraper element and commutator rings rotated, the electric potential generated by the thermocouple was picked up by the stationary carbon brushes and transferred to the stationary temperature recorder. After a short period of operation, e.g., from as little as two days to as long as two weeks, a coating developed on the brass commutator as a result of the corrosive environment outside of the reactor. The presence of the aforesaid coating interrupted temperature measurements and, therefore, required periodic removal. Since such maintenance was possible only during a scheduled shutdown, various periods when no temperature measurements were obtained were encountered. Operation of the reactor under these conditions was, therefore, unsatisfactory.

EXAMPLE II

Pigmentary titanium dioxide was produced by vapor phase oxidation of titanium tetrachloride in the manner described in U.S. Pat. No. 3,214,284 in a reactor similar to that illustrated in FIG. 1. Five chromel-alumel thermocouples were installed in the air cooled hollow support member 16 as shown in FIG. 1. A ceramic scraper edge was attached to the support member which edge removed titanium dioxide accumulations from the reactor wall. The terminal ends of said thermocouples were connected electrically to a rotary switch having five positions. Leads of the same material as the thermocouples connected electrically the rotary switch to electrically insulated mercury baths in the manner shown in FIG. 1. Additional similar leads connected the mercury baths to a temperature recorder. This unit, although in service for over twelve months, has not required any maintenance on the mercury bath temperature transfer mechanism and provided uninterrupted temperature measurements of the support member's metallic surface.

While there are above described a number of specific embodiments of the present invention, it is obviously possible to produce other embodiments and various equivalent modifications thereof without departqnf from the spirit of the invention.

Having set forth the general nature and specific embodiments of the present invention, the scope thereof is now particularly pointed out in the appended claims.

I claim:

1. A method for controlling temperature of a rotating internally cooled scraper element through which coolant is passed, which scraper element dislodges titanium dioxide accumulation formed by the oxidation of titanium halide selected from the group consisting of titanium tetrachloride, titanium tetrabromide and titanium tetraiodide from the internal surface of a reactor vessel, which comprises measuring the temperature of a spot in the scraper element with thermoelectric means having a hot junction in good thermal contact with the section of the scraper element at said spot, connecting electrically the terminals of the thermoelectric means to separate electrically insulated mercury baths, connecting electrically the mercury baths to temperature measurement means, introducing coolant into said scraper element and controlling the temperature of said scraper element by regulating the heat removed by the coolant passing through the scraper element in response to the measured temperature.

2. A method for controlling temperature of an internally cooled scraper element through which coolant is passed, which scraper element dislodges metal oxide accumulation from the internal surface of a reactor vessel wherein the corresponding metal halide is oxidized, which comprises measuring the temperature of a spot in the scraper element with thermoelectric means having a hot junction in good thermal contact with the section of the scraper element at said spot, connecting electrically the terminals of the thermoelectric means to separate electrically insulated mercury baths, connecting electrically the mercury baths to temperature measurement means, introducing coolant into said scraper element and controlling the temperature of said scraper element by regulating the heat removed by the coolant passing through the scraper element in response to the measured temperature.

3. A method according to claim 2 wherein the metal oxide is titanium dioxide and the metal halide is titanium tetrachloride.

4. Apparatus for controlling temperature of a rotating internally cooled metallic scraper element that dislodges metal oxide accumulation formed by oxidation of the corresponding metal halide from the internal surface of a reactor vessel, said scraper element having fluid inlet and outlet means through which coolant passes, comprising thermoelectric means having a hot junction and a pair of terminal ends, the hot junction being attached to and in good thermal contact with the scraper element at the spot at which temperature is to be measured, separate electrically insulated mercury baths, each being in electrical contact with one of the pair of terminal ends of said thermoelectric means, temperature measurement means electrically connected to said mercury baths, and automatic cooling fluid rate control means connected to said temperature measurement means and responsive to the measured temperature.

* * * * *